United States Patent [19]

Roland

[11] 4,016,461
[45] Apr. 5, 1977

[54] STARTING CIRCUIT FOR SWITCHING REGULATOR

[75] Inventor: John Thomas Roland, Manheim, Pa.
[73] Assignee: AMP Incorporated, Harrisburg, Pa.
[22] Filed: May 6, 1976
[21] Appl. No.: 683,971
[52] U.S. Cl. .................................. 361/18; 321/2; 323/DIG. 1; 323/17
[51] Int. Cl.² ............................................ G05F 1/58
[58] Field of Search ....... 317/33 VR; 323/17, 22 T, 323/DIG. 1; 321/2, 11, 14

[56] References Cited

UNITED STATES PATENTS

| | | | |
|---|---|---|---|
| 3,335,361 | 8/1967 | Natale et al. | 323/22 T |
| 3,573,553 | 4/1971 | Mietz | 317/33 VR |
| 3,934,189 | 1/1976 | Schamel | 323/17 |
| 3,959,714 | 5/1976 | Mihelich | 323/DIG. 1 |

FOREIGN PATENTS OR APPLICATIONS 812,939  5/1969  Canada ................ 323/DIG. 1

*Primary Examiner*—Gerald Goldberg
*Attorney, Agent, or Firm*—Gerald K. Kita

[57] ABSTRACT

In a transistor switching type voltage regulation circuit, energy precharge is provided in a by-pass loop around the switching transistor. The instantaneous peak power dissipation at turn-on through the switching transistor is thereby diminished, greatly increasing the reliability of the switching transistor.

2 Claims, 1 Drawing Figure

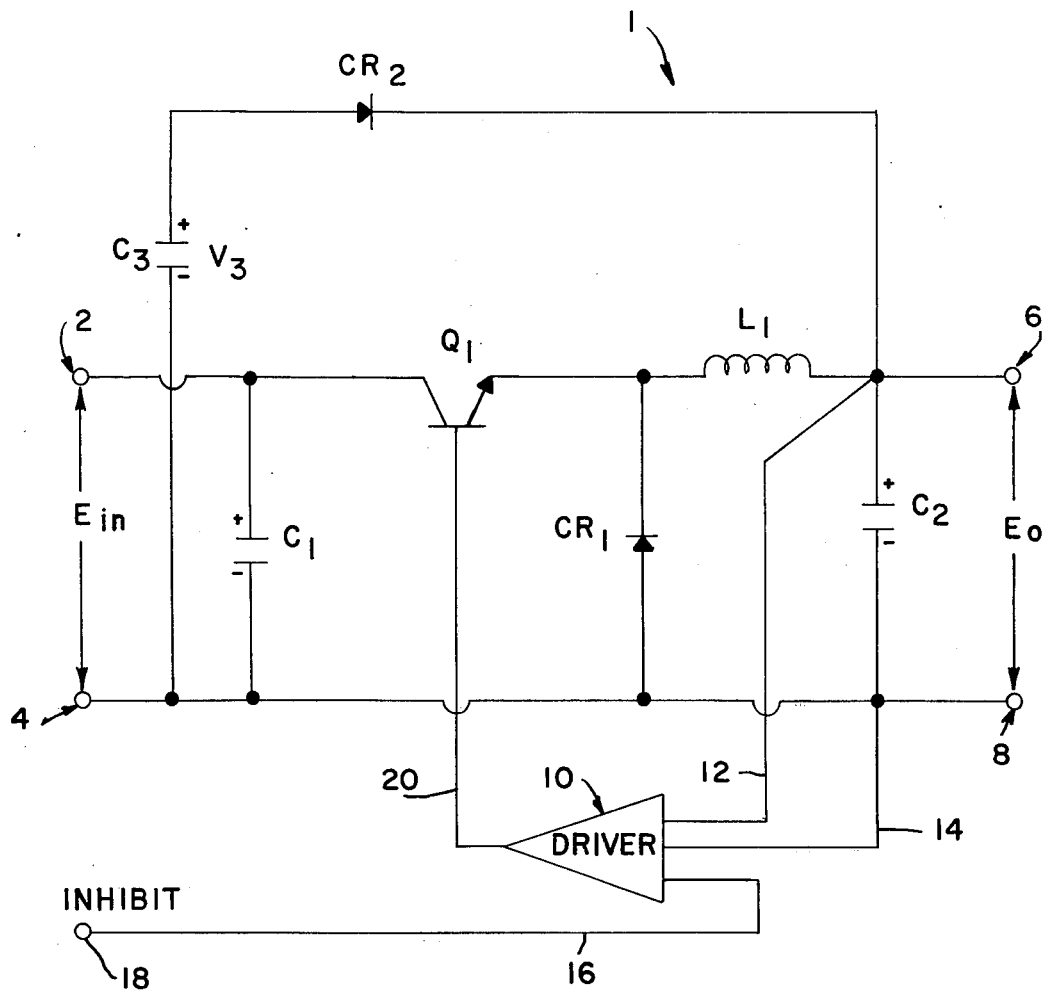

STARTING CIRCUIT FOR SWITCHING REGULATOR

The present invention relates to protection of a switching transistor in a voltage regulator and more particularly to using a switching transistor to initiate energy transfer to a load while by-passing the transistor with at least some of the energy thus reducing the instantaneous peak power stress on the transistor during turn-on.

In a typical voltage regulation circuit, an output capacitor supplies energy to a load at constant output voltage. The energy drain from the capacitor is replaced by energy from an unregulated voltage supplied through a switching transistor. At turn-on the switching transistor dissipates the instantaneous peak power and is subjected thereby to considerable stress.

In the voltage regulator of the present invention, there is provided an energy by-pass loop which supplies a precharge to the load supplying capacitor upon turn-on of the switching transistor. Since the switching transistor is by-passed by the precharge, its instantaneous peak power dissipation at turn-on is lessened or diminished, greatly increasing its reliability thereby.

It is accordingly an object of the present invention to minimize the power stress on a switching transistor of a regulated voltage supply.

Another object of the present invention is to increase the reliability of a switching transistor in a voltage regulator by decreasing the energy to be dissipated through the transistor which is utilized to initiate energy transfer at turn-on thereof.

Another object of the present invention is to provide an energy by-pass loop around a switching transistor of a voltage regulator, which by-pass loop serves as a starter circuit which supplies a precharge to a load supplying capacitor of the regulator at turn-on of the switching transistor.

Other objects and many attendant advantages of the present invention will become apparent from perusal of the following detailed description taken in conjunction with the accompanying drawing.

The FIGURE is a schematic of a preferred embodiment according to the present invention.

With more particular reference to the FIGURE there is shown generally at 1 a switching regulator provided with a starter circuit. The regulator includes a pair of input terminals 2 and 4 providing an input for an unregulated voltage supply $E_{in}$. In parallel with the input is a charging capacitor $C_1$, the positive side of which is connected to the collector of an appropriate transistor $Q_1$. Coupled across the emitter of $Q_1$ and the negative side of the capacitor $C_1$ is a rectifier $CR_1$. Also coupled to the negative side of the capacitor $C_1$ is a negative side of an output or load supplying capacitor $C_2$. An inductor $L_1$ is connected in series between the emitter of $Q_1$ and the positive side of $C_2$. In parallel with $C_2$ are a pair of output terminals 6 and 8 designed to supply a controlled output voltage $E_o$ to a load which is to be connected across the terminals 6 and 8. The terminals 6 and 8 thereby provide an output for the regulator. A driver-regulator control circuit is shown schematically at 10 and has a first input 12 connected to the junction of $L_1$ and $C_2$ and a second input 14 connected at the negative side of $C_2$. A third input line 16 is connected to an inhibit input represented by terminal 18. The output of the driver-regulator control circuit is connected to the base of $Q_1$.

In the usual or normal mode of operation an unregulated input voltage $E_{in}$ is applied at the input and $C_1$ is charged up, for example, to 150 volts DC. Sometime later the inhibit signal is removed, and with proper signals over the input 12 and 14 indicating that $C_2$ needs resupplied with energy, the driver-regulator control circuit 10 is caused to conduct and bias the base of transistor $Q_1$ causing it to turn-on. Energy is transferred from $C_1$ through $Q_1$ and $L_1$ into $C_2$, according to accepted operation of the circuit which is well known. The instantaneous peak power dissipation through $Q_1$ can be calculated. For example if $C_2$ were 1000 uf and the voltage $E_o$ were 40 volts DC, the energy is equal to ½ $C_2 V_1^2 = 0.8$ joules.

Accordingly $Q_1$ has to transfer 0.8 joules of instantaneous peak power. In order to determine the power stress on $Q_1$, assume that $C_2$ would be charged to 40 volts DC in 50 microseconds with constant current charging. Then, the current through $Q_1$ equals $$I \cong \frac{(\Delta E)(C)}{\Delta T} = 800 \text{ amperes.}$$

In the present invention to reduce the peak power dissipation, i.e., the peak power stress at turn-on, a capacitor $C_3$ with an associated rectifier $CR_2$ in series is connected at the negative side of $C_1$ and the junction of $L_1$ and $C_2$. By adding the voltage source $V_3$ and $CR_2$ as shown, $C_2$ can be, in effect, precharged with energy instantly upon application of input power or turn-on of $Q_1$. The amount of energy supplied by $V_3$ equals ½ $CV_3^2$. Herein $V_3$ is assumed to be 36 volts DC (maximum). Then the precharge equals 0.648 joules. This precharge of energy is accordingly provided in the by-pass loop around transistor $Q_1$. Since 0.648 joules is supplied to $C_2$ without being transferred through $Q_1$, $Q_1$ has to transfer only 0.152 joules of energy to $C_2$ upon removal of the inhibit signal as opposed to 0.8 joules without $V_3$ and $CR_2$. Under all modes of operation the voltage on $C_2$ must be greater than $V_3$ plus the forward drop across $CR_2$. With $V_3$ and $CR_2$ the current through the transistor $Q_1$ is only 80 amperes at turn-on. Accordingly the instantaneous peak power dissipation is reduced by a factor of 10 with the addition of $V_3$ and $CR_2$. Therefore the reliability of $Q_1$ is greatly improved.

Although a preferred embodiment of the present invention is described and shown in detail other embodiments and modifications which would be apparent to one having ordinary skill in the art are intended to be covered by the spirit and scope of the appended claims.

What is claimed is:

1. In a switching regulator for controlled output voltage having an input for unregulated DC and a switching transistor connected between a charging capacitor and an output load capacitor, the improvement comprising:
   an energy storing capacitor in parallel with both said charging capacitor and said switching transistor, and
   a rectifier between said energy storing capacitor and said output load capacitor, whereby the energy dissipated from said charging capacitor through said switching transistor is lessened by the energy dissipated from said energy storing capacitor directly to said output load capacitor upon turn-on of said switching transistor.

2. The structure of claim 1 wherein said energy storing capacitor is connected between the unregulated DC input and the output load supplying capacitor.

* * * * *